Jan. 26, 1965 C. A. CLARK 3,167,306
BLENDER
Filed March 14, 1963 2 Sheets-Sheet 1

INVENTOR.
Claude A. Clark
BY
Earl D. Ayers
AGENT

Jan. 26, 1965  C. A. CLARK  3,167,306
BLENDER

Filed March 14, 1963  2 Sheets-Sheet 2

INVENTOR.
Claude A. Clark
BY Earl D. Ayers
AGENT

United States Patent Office 3,167,306
Patented Jan. 26, 1965

3,167,306
BLENDER
Claude A. Clark, Houston, Tex., assignor to The Dow Chemical Company, Midland, Mich., a corporation of Delaware
Filed Mar. 14, 1963, Ser. No. 265,245
18 Claims. (Cl. 259—4)

This invention relates to blending apparatus and particularly to dry product blenders in which the material to be blended may be transported in a stream of gas.

Many applications exist where it is desirable and/or necessary to blend together more than one type, color, or grade of material to produce a composite blend which has predetermined characteristics.

For example, various types of wheat may, when blended and milled, result in a flour which has characteristics which are unique or are more desirable than those of flour made from any one variety of wheat.

Another example of blending which is often done is to blend granular materials of various grades or colors to form a composite mass of granules which have desirable characteristics.

Although some blenders are available for blending free flowing materials including powders, many of these are either expensive to purchase, maintain, and/or operate, or do a less than adequate blending job.

Accordingly, a principal object of this invention is to provide an improved blender for free flowing particulate materials.

Another object of this invention is to provide an improved dry product blender which is capable of blending materials at a rapid rate.

A further object of this invention is to provide an improved dry product blender for particulate materials which is simple to construct and to operate.

In accordance with this invention, there is provided a chamber having generally symmetrically disposed vertical partitions therein which divide the chamber into a plurality of compartments.

Means are provided for withdrawing particulate material in metered amounts or proportions from the bottom part of the compartments, gravity flowing the so withdrawn material into a common conduit and pneumatically transporting the material through said conduit upwardly and into the upper part of the chamber where it is directed against a distribution surface from which the material is dispersed in random manner into the compartments of the chamber.

The material is re-circulated and dispersed until the product mix in each compartment is more or less identical.

Usually the chamber is initially filled by feeding the particulate material into the top of the chamber and onto a dispersing plate or by other means causing the particulate material to pass into the various compartments.

The invention, as well as additional objects and advantages thereof, will be best understood when the following detailed description is read in connection with the accompanying drawings, in which.

Figure 1:
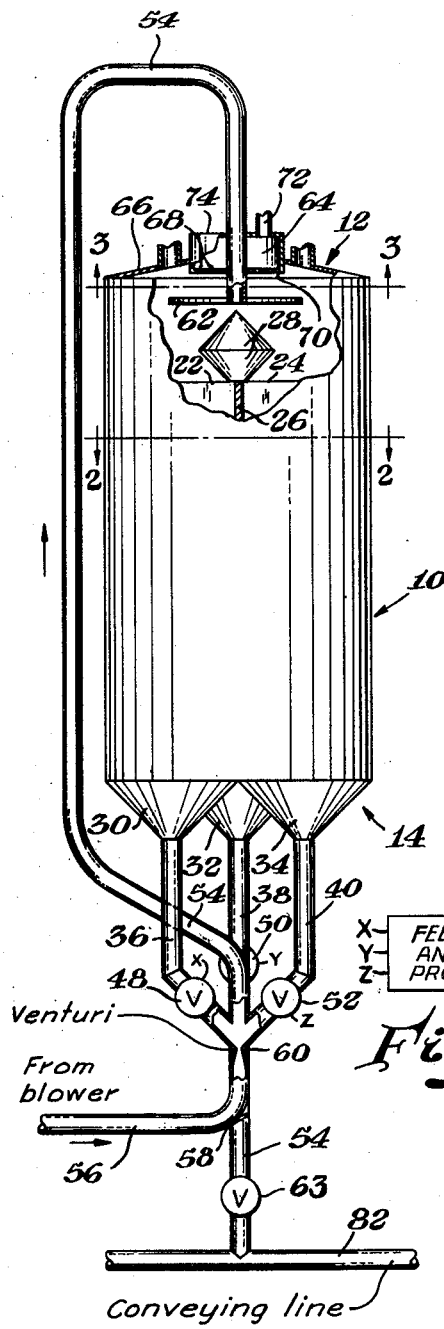
FIG. 1 is a side elevational view, partly broken away and in section, of blending apparatus in accordance with this invention.
Figure 2:
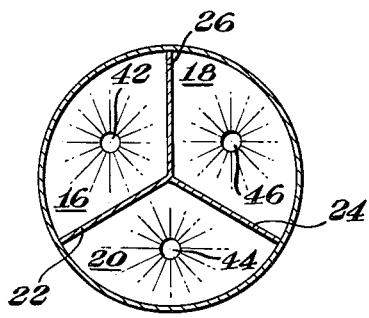
FIG. 2 is a sectional view taken along the line 2—2 of FIG. 1.
Figure 3:
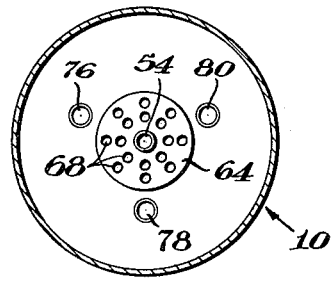
FIG. 3 is a sectional view taken along the line 3—3 of the top assembly.

Referring to the drawing and particularly to FIGS. 1, 2, and 3, there is shown an elongated vertically disposed hollow chamber, indicated generally by the numeral 10, which is, except at its upper end part 12 and lower end part 14, generally tubular in shape and symmetrically disposed around its longitudinal axis.

The chamber 10 is divided into there compartments 16, 18, and 20 by means of the partitions 22, 24, and 26. Each of the partitions extends from the longitudinal axis of the chamber 10 to a side wall of the chamber, the radial spacing between adjacent partitions being about 120 degrees. The partitions 22, 24, and 26 extend from the bottom of each compartment to within a short distance of the top of the chamber 10. A dispersing element 28, presenting a conical surface towards the top 12 of the chamber 10, is disposed along the longitudinal axis of the chamber. As illustrated, the dispersing element 28 is secured to the top part of the partitions 22, 24, and 26 at their junction, with the longitudinal axis of the chamber coinciding with the longitudinal axis of the dispersing element.

The lower end part 14 of the chamber 10 has three hoppers 30, 32, and 34 extending downwardly therefrom. The upper or top end part 12 of the chamber is a more or less conventional closure, e.g. a more or less conical member (wide base as compared to the height of the closure member).

Each of the hopper sections 30, 32, and 34 at the lower end of the chamber discharges into an individual conduit or line. Lines 36, 38, and 40, coupled to the hoppers 30, 32, and 34, respectively, are shown. In FIG. 2, the bores 42, 44, and 46 to which the individual discharge lines are coupled, may be seen. Each of the discharge lines has a valve 48, 50, and 52 which are disposed along and coupled to lines 36, 38, and 40, respectively. Each of the valves 48, 50, 52 are coupled by means of suitable leads X, Y, Z, respectively, to a feed time and rate programmer.

Each of the discharge lines is coupled to a single pipe-like member 54, the lines 36, 38, and 40 intersecting the member 54 at an angle of about 45 degrees with respect to the longitudinal axis of the member 54 at the point of intersection, each being separated radially from the other by an angle of about 120 degrees. The discharge lines each intersect the member 54 at about the same point along its length.

The pipe-like member 54 is of substantially the same diameter above and below the point along its length where the discharge lines 36, 38, and 40 intersect it. The part of the member 54 which lies below the intersection of the lines from the feeder valves 50, 52, and 54 is coupled through the line 56 and flap gate valve 58 to a blower (not shown) which has its intake coupled to an air filter. In addition, the part of the member 54 which lies below constricted part 60 is coupled to a pneumatic conveying line 62. A valve 63 is provided in the line 54 just above the conveying line 62.

The pipe-like member 54, above the point where the lines 36, 38, and 40 intersect it, swings out and up along the outside of the chamber 10 and then curves over and downwardly to enter the chamber 10 through the upper end part 12 and along the longitudinal axis of the chamber.

The pipe-like member 54 terminates a few inches above and is aligned with the dispersing element 28. An outwardly extending flange 62 which is at least as large in diameter, and preferably larger, than the diameter of the dispersing element 28 surrounds the output end part of the pipe-like member 54.

A venting member 64 which has a hollow cylindrical configuration surrounds the pipe-like member 54 as it passes through the top 66 of the chamber. The venting member has an array of bores 68 extending through its bottom 70 and has a large vent tube 72 extending through its upper end 74. The diameter of the venting member 64 is usually, but not necessarily, smaller than the diameter of the flanged part 62. Material feeding bores 76, 78, and 80 extend through the top 12, one of the bores being disposed over each of the compartments 16, 18, and 20 of the chamber 10.

In operation the particulated material to be blended is fed into the top of the chamber 10 through the product fill bores 76, 78, and 80 and into the respective compartments of the chamber 10 which are formed by the partitions 22, 24, and 26. Normally the valves 48, 50, and 52 are closed while the chamber is being filled with particulated material.

When the materials in the compartments of the chamber 10 are to be blended, the flap gate valve 58 is positioned to permit air to pass into the member 54. The valve 63 is closed and the blower is then operated to force a stream of air through the line 56 and up through the member 54. The valves 48, 50, and 52 in the various discharge lines are then opened (preferably to permit a balanced or predetermined rate of flow through each valve), permitting particulated material to enter the pipe-like member 54 just above the constricted part 60. The upwardly directed air flow through the member 54 is adjusted to exceed the falling rate of the particulated material, thereby carrying particulated material from the three discharge lines up through the member 54 with sufficient velocity to cause them to discharge from the end of the member 54 which is adjacent to the flanged part 62, and impinge on the upper conical surface of the dispersing element 28 and be dispersed in a random manner into the compartments in the chamber. Circulation of the particulated materials is continued until the proper blending of the contents of the chamber is accomplished. Usually viewing ports (not shown) are provided in the various hopper discharge lines in order that the appearance of the blend in each discharge line may be observed.

When blended material is to be discharged from the chamber, the blower (not shown) is shut off, the flap gate valve 58 is adjusted to close off the line 56 and open the line 54 to the valve 63. The star valve 63 is then operated (along with the opened valves 48, 50, and 52) to convey particulated material from the chamber 10 into the conveying line 82.

Figure 4:
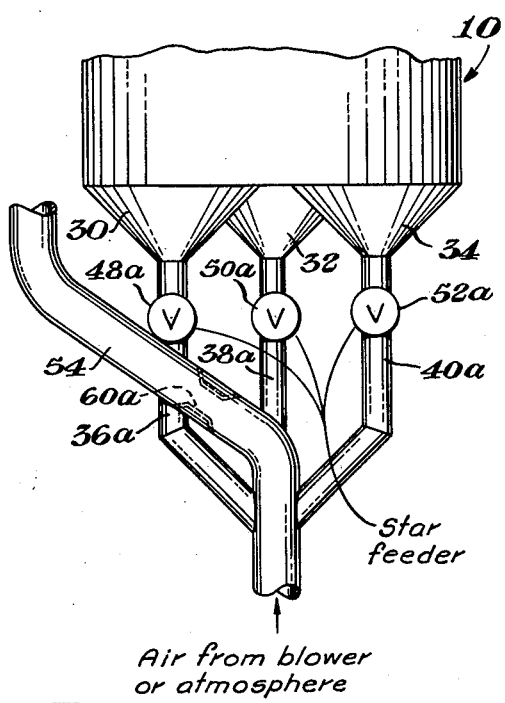
FIG. 4 is a fragmentary elevational view, partly in section, of an alternative granular product dispersing device for use in accordance with this invention.

In the alternative embodiment of the invention which is illustrated in FIG. 4 the pipe-like member 54a has no constricted part just below the point where the discharge lines 36a, 38a, and 40a enter the member 54a. The valves 48a, 50a, and 52a, therefore, are star feeder or other type valves which isolate the compartments from the air (or other gas) pressure which exists in the discharge lines below these valves. To provide more extensive mixing of the particulate material as it passes up the member 54a, one or more venturi-like constrictive elements 60a may be provided in the member 54a. The use of additional constrictions along the member 54 shown in FIG. 1 may also be used, the additional constrictions being above the constricted part 60.

Figure 5:
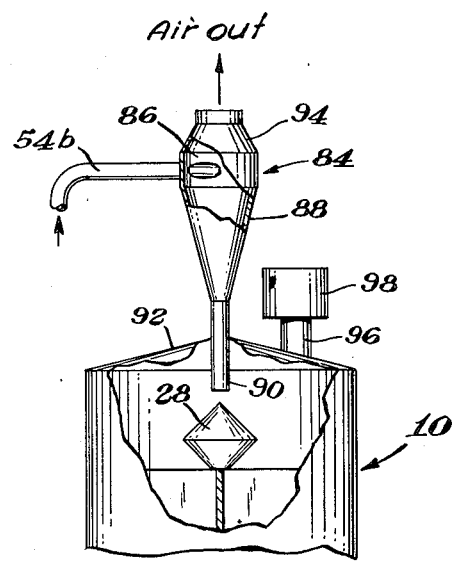
FIG. 5 is a fragmentary sectional view of an alternative embodiment of this invention which is especially adapted for use in blending powdery products.

In the embodiment of the invention which is shown in FIG. 5 the upper end of the pipe-like member 54a terminates in a cyclone separator 84 in which the particulate material enters more or less tangentially a hollow chamber at the part 86 of it which has the largest diameter. A funnel-like member 88 has its spout 90 extending through the top 92 of the chamber 10 in alignment with the dispersing element 28. The upper part of the funnel member has the same diameter as and is coupled to the large diameter part 86 of the separator.

A frusto-conical part 94 comprises the upper part of the separator and has a base diameter which is at least approximately the same as the diameter of the separator at the point where the pipe-like member 54a enters the separator.

In the embodiment of the invention shown in FIG. 5 the rest of the structure is the same as shown in FIGS. 1 or 4. This embodiment is especially advantageous where powdery type materials are to be blended. The separator provides a convenient means to remove the air from the powdery material before the powdery material is directed onto the dispersing element. In operation, the air and powdery material enters the separator tangentially, causing swirling of the mixture within the separator, the powdery material, being heavier, moving downwardly and the air moving upwardly and escaping through the top of the separator.

A vent 96 and filter 98 are also provided in the top 92 of the chamber to permit venting of the chamber.

In one blender made in accordance with this invention the chamber is 45 feet high, exclusive of the hoppers, and is 10 feet in diameter. The partitions 22, 24, and 26 extend to within 6 feet of the top of the chamber. The member 54 has an inside diameter of about 1 foot. The diameter of the dispersing element 28 is about 4 feet.

With a conventional standard squirrel cage blower driven by a 20 horsepower motor coupled to the line 54, 100,000 pounds of polyethylene pellets were thoroughly blended in less than 3 hours. The ease with which blending is accomplished using a blower of relatively small capacity is attributed to the fact that the pipe-like member 54 is of relatively large diameter (reducing friction losses).

It is obvious that the blending apparatus of this invention may be used in combination with closed system air or inert gas recirculation if such is desirable for a particular application. Automatic controlling of the timing and flow rates of the star feeder valves 48a, 50a, and 52a and of the output of the blower is also contemplated.

While the invention has been described in connection with a chamber having three compartments and three discharge lines, blenders having two or more compartments are practicable. When only two compartments are provided the time required to achieve a specific degree of blending is longer than when the blender contains three compartments.

Blenders having more than three compartments can achieve a specified degree of blending in a shorter period of time than if fewer compartments were used, but the added cost of additional compartments, hoppers, valves, etc. often makes the resultant reduction in blending time uneconomical from a practical operational standpoint.

Particulate materials of several size ranges have been blended in apparatus made in accordance with this invention. The size of the particles may vary from powder, sand granules from fine to coarse size, to pellets which are a quarter of an inch or more in their longest dimension, for example. Actually, the practical limitation on pellet or grain size which can be so blended for example, is the partial weight which the pressurized air can carry up the vertically inclined member 54 and cause to impinge on the dispersing element before being deflected into the open topped compartments of the chamber.

What is claimed is:

1. Blending apparatus comprising a hollow chamber having side walls, an upper end, a lower end, a longitudinal axis, and a plurality of compartments therein, said compartments being separated one from another by a plurality of partitions, said partitions being generally parallel with the longitudinal axis of said chamber, the partitions extending from the lower end of said chamber a substantial part of the way to said upper end, each of said compartments having a hopper communicating with the lower part, a hollow member having an upper end and a lower end, said hollow member extending from below the lower end of said hoppers upwardly along said chamber and then downwardly along the longitudinal axis of the chamber and through the top of said chamber and terminating above said partitions, a plurality of discharge lines, one of said discharge lines being coupled between each of said hoppers and the part of said hollow member which is below said hoppers, each of said discharge lines having flow control means coupled thereto, valved conduit means coupled to the lower end of said hollow member part for sequentially applying gas under pressure upwardly through said hollow member in one direction and for withdrawing material from said chamber through said lower end of said hollow member in another direction, means for feeding particulated materials into said compartments from the upper end of said chamber, and means for randomly dispersing into said compartments particulated materials which are blown from said hollow member as gas is applied under pressure to the lower end of said hollow member.

2. Apparatus in accordance with claim 1, wherein said compartments are substantially equal in size.

3. Apparatus in accordance with claim 1, wherein said means for randomly dispersing particulated materials is spaced from and in axial alignment with the upper end part of said hollow member.

4. Apparatus in accordance with claim 1, wherein the flow control means in each discharge line is a star feeder valve.

5. Apparatus in accordance with claim 4, wherein means are provided for programming the operation of said star feeder valves.

6. Apparatus in accordance with claim 5, wherein said programming includes both the time and flow rate at which said star feeder valves function.

7. Apparatus in accordance with claim 1, wherein the coupling of the discharge lines to the hollow member is symmetrical with respect to a plane perpendicular to the longitudinal axis of said chamber.

8. Apparatus in accordance with claim 7, wherein a venturi-like constriction is disposed in said hollow member just below where said discharge lines are coupled to said hollow member.

9. Apparatus in accordance with claim 1, wherein said hollow member, in extending upwardly, is outside of said chamber.

10. Apparatus in accordance with claim 1, wherein said means for randomly dispersing particulated materials blown from said hollow member comprises a generally conical surface of substantially wider diameter than said riser pipe, said surface being disposed in spaced apart axially aligned relationship with respect to said riser pipe.

11. Apparatus in accordance with claim 1, wherein the diameter of said hollow member is about $\frac{1}{10}$th the diameter of the chamber, said chamber being cylindrical along a major part of its length.

12. Apparatus in accordance with claim 1, wherein the means for feeding particulated materials into said compartments comprises a separate feed line directed into each compartment.

13. Apparatus in accordance with claim 1, wherein there are three compartments.

14. Apparatus in accordance with claim 1, wherein said means for feeding particulated materials into said compartments comprises an axially disposed feed lines at said upper end directed at a dispersing member.

15. Apparatus in accordance with claim 1, wherein said hollow member has one or more venturi-like constrictions disposed along its length.

16. Apparatus in accordance with claim 1, wherein the upper end part of said hollow member includes a particulate materials separator element.

17. Apparatus in accordance with claim 1, wherein said chamber is vented.

18. Apparatus in accordance with claim 1, wherein the changes in direction along said hollow member are gradual.

References Cited in the file of this patent

UNITED STATES PATENTS 923,571 Paterson ---------------- June 1, 1909

FOREIGN PATENTS 523,717 Belgium ---------------- Nov. 14, 1953
523,024 Italy ------------------- Dec. 17, 1956